United States Patent [19]

Faris

[11] Patent Number: 5,096,520

[45] Date of Patent: Mar. 17, 1992

[54] METHOD FOR PRODUCING HIGH EFFICIENCY POLARIZING FILTERS

[76] Inventor: Sades M. Faris, 24 Pocantico River Rd., Pleasantville, N.Y. 10570

[21] Appl. No.: 561,104

[22] Filed: Aug. 1, 1990

[51] Int. Cl.⁵ .............................................. G02B 26/00
[52] U.S. Cl. ........................... 156/99; 359/37; 359/64; 359/487; 359/488; 359/502
[58] Field of Search ............... 350/334, 337, 339, 345, 350/394, 395, 397, 408, 166; 156/99, 251, 252

[56] References Cited

U.S. PATENT DOCUMENTS

| | | | |
|---|---|---|---|
| 2,617,329 | 11/1952 | Dreyer | 350/396 |
| 4,035,060 | 7/1977 | Tsunoda | 350/337 |
| 4,798,448 | 1/1989 | Van Raalte | 350/345 |
| 4,838,661 | 6/1989 | McKee | 350/345 |
| 4,893,906 | 1/1990 | Makow | 350/334 |
| 4,946,259 | 8/1990 | Matino | 350/339 |
| 4,965,562 | 10/1990 | Verhulst | 350/345 |

FOREIGN PATENT DOCUMENTS 0771074  3/1957  United Kingdom ............... 350/396

OTHER PUBLICATIONS

Donald A. Bolon et al., SID 87 DIGEST, p. 395, 1987.
William J. Latham et al., SID 87 DIGEST, p. 379, 1987.
Mamoru Yoshida et al, SID 88 DIGEST, p. 242, 1988.
M. Katayama et al. SID 88 DIGEST, p. 310 1988.
Kenichi Niki et al. SID 88 DIGEST, p. 322, 1988.
Martin Schadt, Jurg Funfschilling, SID 90 DIGEST, p. 324, 1990.

*Primary Examiner*—William A. Powell
*Assistant Examiner*—J. Sells

[57] ABSTRACT

The manufacturing cost of color liquid crystal displays depends on improving the yield of making color filter arrays and the polarization efficiency of polarizers to increase the brightnesse, and to reduce the power of the back light. The invention describes a method for combining the filter function, with the polarization function on the same substrate, resulting in improved yield, improved color quality, reduced cost, and increased polarization efficiency, approaching 100% in the transmission mode. The new method comprises a periodic stack of laminates each of which has a reflector layer on one side of a clear glass substrate, and a polarizing filter layer on the other side of the substrate. Each period consists of red, green and blue filters. The laminates are bonded together and sliced at 45 degree angle. Each slice is polished on both sides to obtain an optical finish and thus becomes polarizing filter array for use as the starting material for fabricating liquid crystal displays.

27 Claims, 4 Drawing Sheets

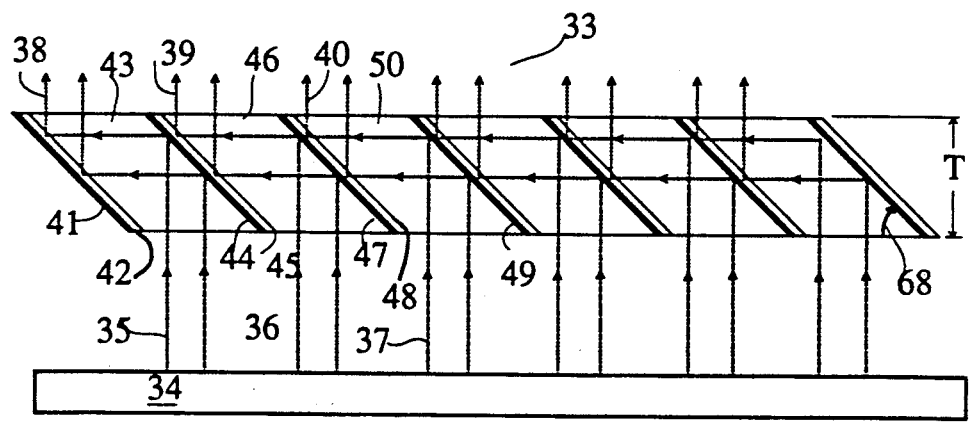
FIG. 3 a
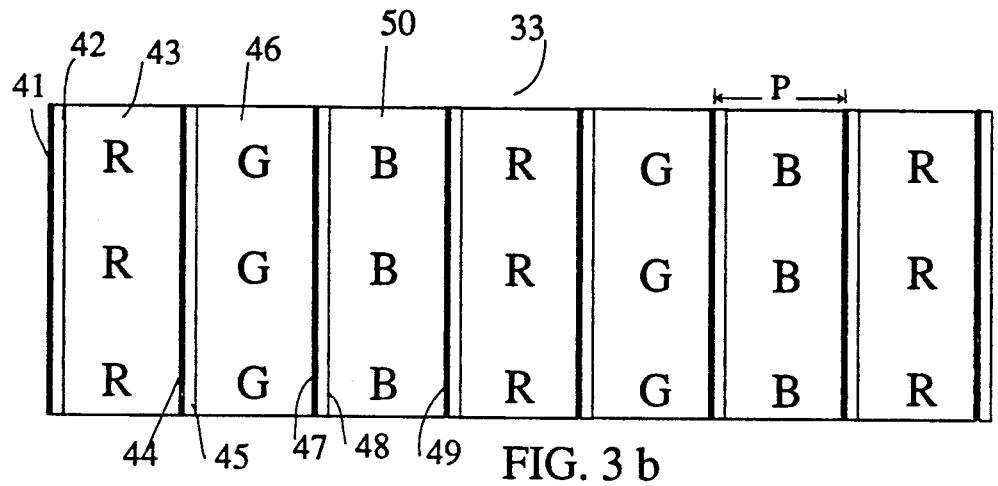
FIG. 3 b
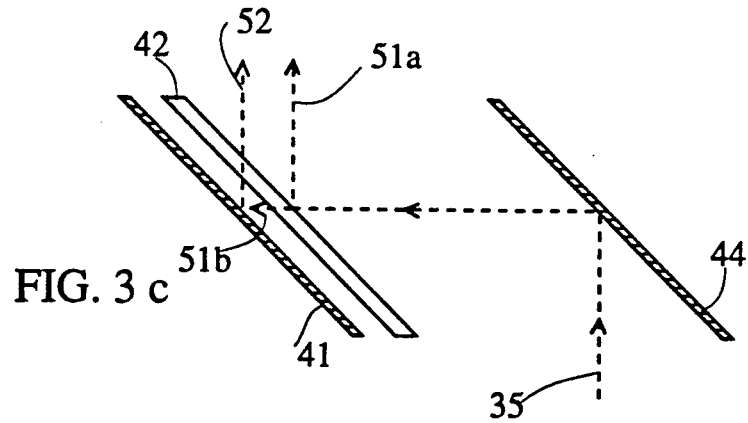
FIG. 3 c
FIG. 3 d
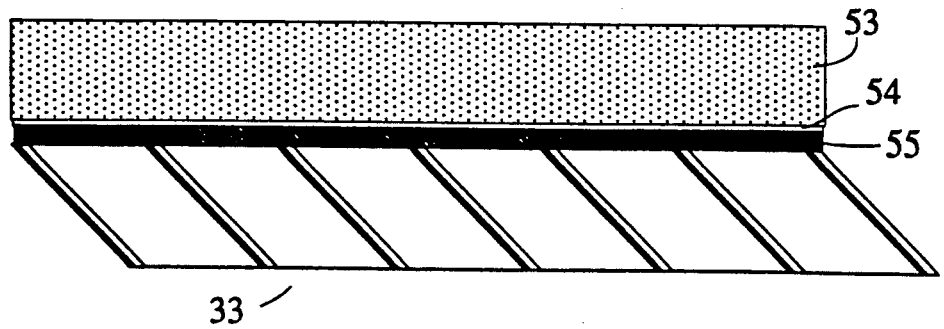

METHOD FOR PRODUCING HIGH EFFICIENCY POLARIZING FILTERS

BACKGROUND OF THE INVENTION

1. Field of the Invention

This invention relates to the manufacturing of polarizers, color filters, and polarizing filters, which are used in display applications. In particular, color liquid crystal displays for projection and direct viewing, rely on such polarizers, and filters for their operation. In the field of 3-D movies, and 3-D computer displays which employ polarization coding of the stereo image pair, use large sheet polarizers. The field also relates the fabrication of micropolarizer arrays for shutters, light valves, and 3-D displays.

2. Description of Prior Art

At present, most laptop computers use monochrome liquid crystal displays, LCD, and recently 14" color LCD's have been announced. It is projected that in the late 90's, LCD's will capture more than 50% share of the display market, and CRT-based displays will lose their dominance. FIG. 1 a illustrates a cross section 1 (side view) of a portion of an active matrix twisted nematic liquid crystal display and FIG. 1 b, a top view of the display showing a pixel array. Each pixel has a thin film transistor, TFT, 3 and either red 7, green 8, or blue filter. The liquid crystal 2 is sandwiched between two parts, The Upper Part and The Lower Part. The Upper Part has a transparent indium-tin-oxide (ITO) electrode 5, the filters 7,8,9, and upper glass substrate 10, a polarizer 11, and back light source 13. The Lower Part has the TFT's 3 fabricated on the a layer of silicon nitride, SiN, on the lower glass substrate 4, and a second polarizer. The TFT 3 is made of amorphous silicon 17, one side of which is the drain 14, and the other is the source 15 which applies a voltage to the liquid crystal through a second transparent ITO electrode 6. The gate 17 is deposited on the glass substrate 4 and is insulated from the amorphous silicon 17 by the SiN layer. Different LCD technologies are described by Mamoru et al, Society of Information Display, SID 88 DIGEST, p242 1988, and M. Katayama, et al, Society of Information Display, SID 88 DIGEST, p 310, 1988, and Kenichi Niki, et al, Society of Information Display, SID 88 DIGEST, p 322, 1988.

The yield, and hence the manufacturing cost of LCD, its performance, brightness and contrast, are affected by three main elements: the TFT fabrication which involves several steps, and the RGB filter which also involves numerous steps and the polarizer efficiencies. Each color filter is made on a separate substrate, patterned, and then transferred to the upper glass substrate 10. This is done in a sequential manner, with each color requiring 4 to 5 steps. Prior art approaches to making filters remain plagued with problems of reproducibility, color control, and high cost. Proposals to solve some of the problems are found in the papers by William Latham et al, Society of Information Display, SID 87 DIGEST, p 379, (1987), and by Donald Bolon et al, Society of Information Display, SID 87 DIGEST, p 395, (1987).

The other element affecting the performance of LCD is related to the efficiency of the polarizers. As described in the paper by T. Nagatsuka et al, Society of Information Display, SID 85 DIGEST, p74 (1985), proper preparation of the polarizers improves the brightness and the contract of LCD. The biggest problem with prior art sheet polarizers used in LCD's remains unsolved. Because they use stretched polyvinyl alcohol, the conversion efficiency of unpolarized light to polarized light cannot exceed 50%. In fact it is limited to about 45% for the best and costliest polarizers. This translates into at least a factor 2 wasted power, requiring brighter light source 13 and added weight to portable computers.

In my co-pending application Ser. No. 07/554,743, entitled "Micro-Polarizers for Window Shutters, Light Valve, and Display Applications", I describe a method for making window shutters which depends on micropolarizer arrays as shown in FIG. 1 c. The shutter 17 comprises a first movable micropolarizer 18, a second fixed micropolarizer 19, and image frame 20 (transparent in the case of a simple window), and a translation means 21 which controls the motion of said first micropolarizer. Each micro-polarizer consists of an array of micro-polarizing strips which have alternating polarization states P1 and P2. Moving one array with respect to the other, the window can be changed from transparent to opaque. In the transmission mode, the prior art polarizers have efficiencies less than 50% and therefore lose half the brightness when the shutter is in the transparent state.

All prior art apparatuses which rely on polarizers in the transmission mode lose at least half the brightness. There is no prior art that teaches how to produce large sheets of polarizers to be used in the transmission mode with efficiency approaching 100%. There is a method by which nearly 100% polarization efficiency is theoretically produced in the reflective mode, it is described by Martin Schadt, and Jurg Funfschilling, Society of Information Displays, SID 90 DIGEST, p 324 (1990). It uses new reflective polarizing filters made of cholesteric liquid crystal silicones (CLCS) polymers described by Martin Schadt and Jurg Funfschilling, Society for Information Display, SID 90 DIGEST, p 324 (1990). This prior art pertains to projection displays and does not teach how to make large area polarizing filters with 100% efficiency in the *transmission mode* as required by large area direct view liquid crystal displays, and the large area micro-polarizer window shutter in FIG. 1 c.

SUMMARY OF THE INVENTION

The principal object of the present invention is to provide means for making polarizing filter arrays for use in liquid crystal displays.

It is another object of this invention to provide means for making polarizing filter arrays that improve the polarizing efficiency to nearly 100% in the *transmission mode*, improve the stability and the reproducibility of colors.

It is another object of this invention to provide means for fabricating polarizing filter arrays which minimize the number of parts and the number of steps in the manufacture of LCD's, increase the yield, and the performance and reduce cost.

It is yet another object of this invention to provide a novel, and the only known means for the manufacture of micro-polarizer arrays for use in shutter, light valve, and display applications that have *transmission mode* polarizing efficiency approaching 100%.

These and other objects will become clear as the description of the preferred embodiments are presented.

BRIEF DESCRIPTION OF THE DRAWINGS

FIG. 1 c describes prior art micropolarizer window shutter.

FIG. 3 a-d illustrates the details of how high polarizing efficiency color filters are produced.

DETAILED DESCRIPTION OF THE PREFERRED EMBODIMENTS

Figure 1:
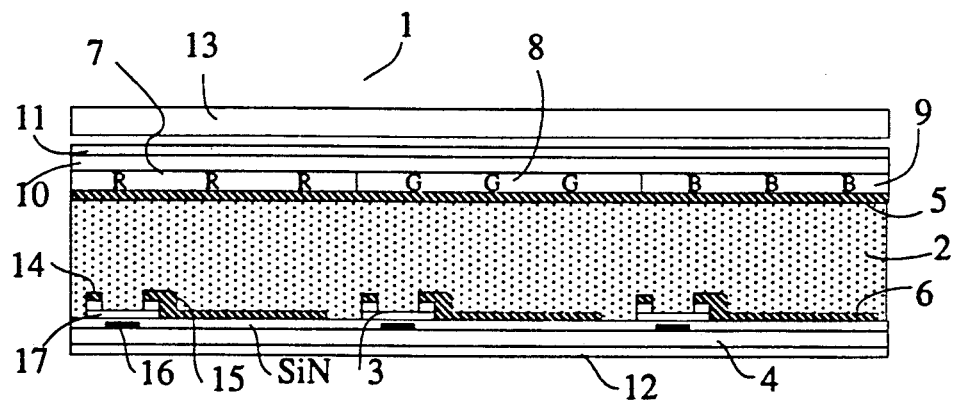
FIGS. 1 a-b describe prior art active matrix liquid crystal display system.
Figure 1:
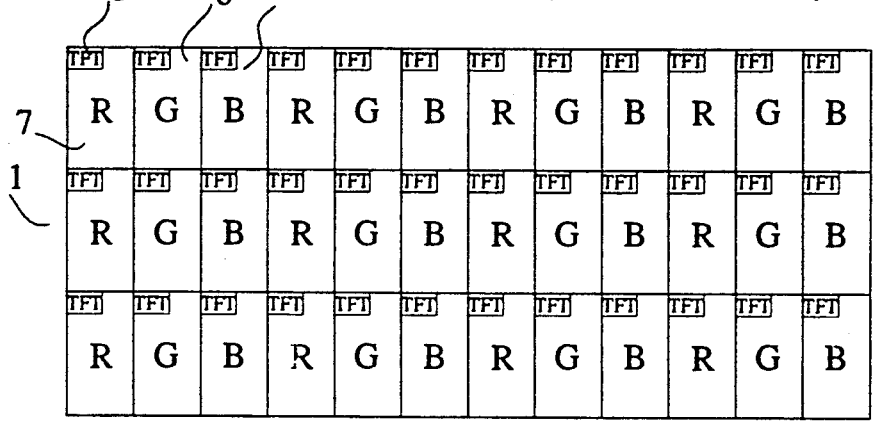
Figure 1:
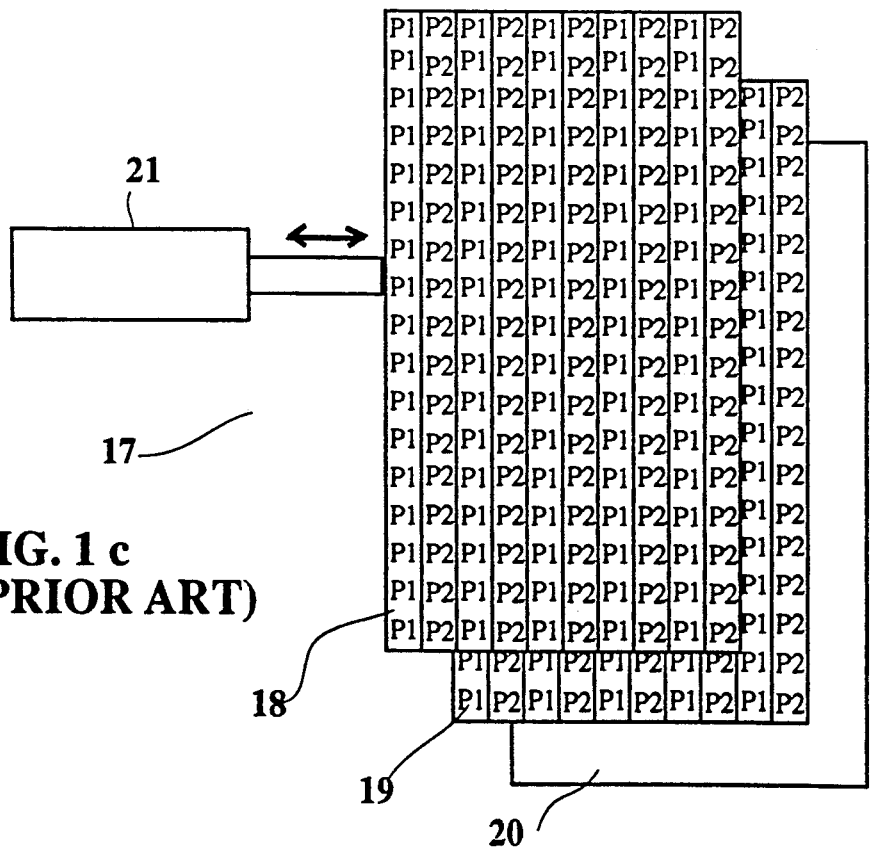
Figure 2:
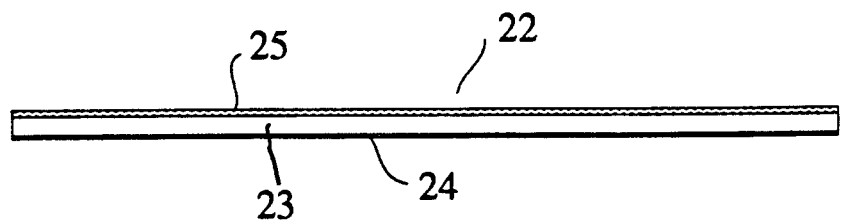
FIGS. 2 a-b describe the method according to this invention of making polarizing filter arrays.
Figure 2:
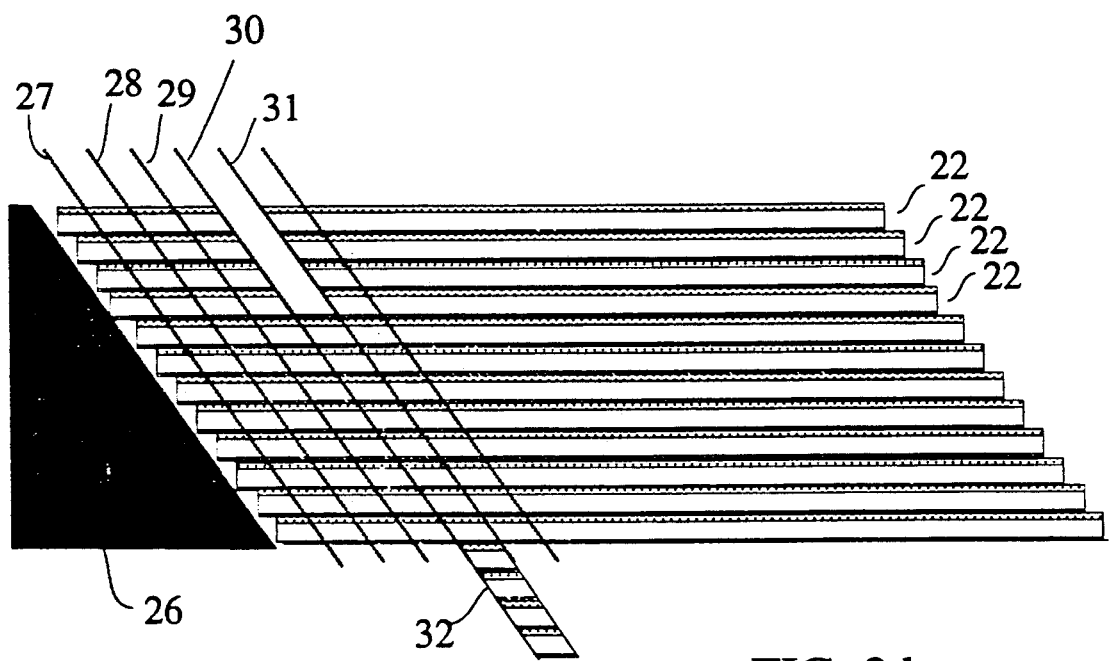
Figure 2:
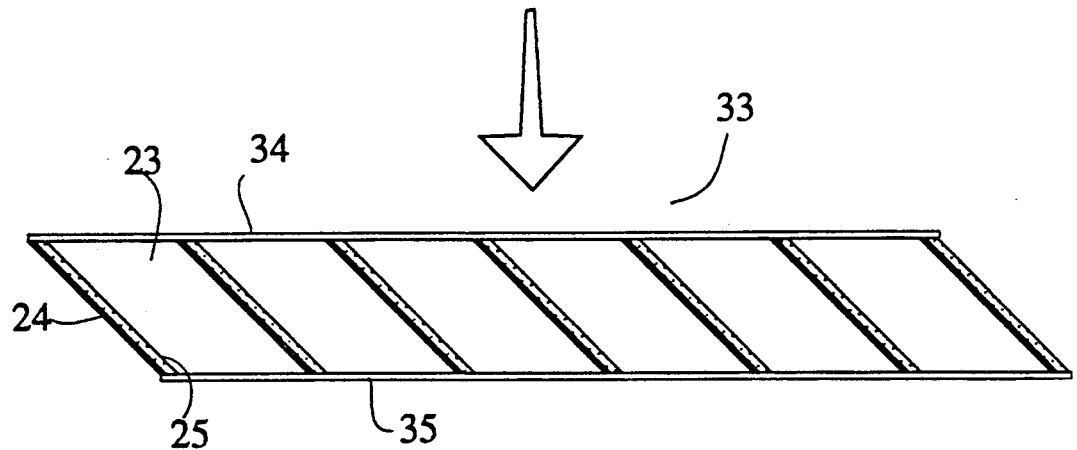

The method for fabricating polarizing filter arrays according to the present invention is described in FIG. 1. The starting material is a laminated sheet 22 which comprises the polarizing filter material film 25, a substrate material 23, and a reflective film 24. The filter material 25 could be made of the commonly used gelatin filter films, dielectric interference filter, cholesteric liquid crystal silicone filters, or stretched polyvinyl alcohol polarizing filter. The thickness of the filters ranges between 10 and 30 microns, depending of the material choice. The important feature of this invention is filter material flexibility. The optimum filter material is selected on the basis of its performance, stability and reproducibility, and is then laminated to the substrate. It has no other constraints, which is the case with prior art methods that require patterning and deposing each of the 3 color filter materials onto the substrate sequentially. This has been a major yield detractor. The substrate material 23 is made of glass, or one of several polymers chosen for their excellent transparency, such as tryacetyl cellulose (TAC), polyethelene terephtalate (PET), polymethyl-metacrylate (PMMA), polycarbonate, polyester, or polyethersulfone (PES). The thickness of the substrate is determined by the display pixel period, and is typically 100 to 150 micron thick. The reflecting layer 24 is made of 1 micron thick aluminum layer, or other dielectric reflectors. After coating the laminated sheets 22 with a clear adhesive, the next step is to stack as many of them as necessary, as shown in FIG. 2 b. The stack is then pushed from left to right against the inclined wall 26 which has an angle equal to the slicing angle (typically 45 degrees), so that the left and the right sides of the stack assume the same angle. The stack is subsequently pressed with a heavy press well known in the furniture manufacturing art, to cause the laminated sheets to bond to each other with a strong bond. The stack is then sliced at the same angle is the inclined wall 26 using diamond or silicon carbide saws which are also well known in the optical component manufacturing art and the silicon slicing art. This slicing process is repeated to make many slices 27, 28, 29, 30, 31, 32 of identical thickness until the entire stack is sliced. The reason for making the stack sides inclined is to minimize material waste. The next step is to polish each slice on both sides to obtain an optical finish. This is done by well known means in the art of making large optical lenses and mirrors. The cross section of the finished product 33 is shown in FIG. 2 c which shows that anti-reflection coatings 34, 35 are deposited on the polished surface of the slice to minimize reflection.

If the starting sheets 22 alternate the color of the their polarizing filters in this order: RGBRGBRGB ... RGB, then the finished slice 33 operates as a polarizing filter array suitable for LCD display. This is described in more detail in FIG. 3. The back light 34 illuminates the slice 33 as shown in FIG. 3 a. The unpolarized white light beam 35 is reflected into the horizontal direction by reflector 44. The angle of incidence with respect to the reflector 44 equal to angle 68, which is typically 45 degrees. The beam 35 propagates in the horizontal direction through the glass or plastic medium 43, and after illuminating the red color filter 42 and the reflector 41, it emerges in the vertical direction as a red beam 38. If the filter 42 is a polarizing type filter, as when PVA or cholesteric liquid crystal silicon (CLCS) polymers are used, then the produced beam 38 is a polarized red beam. The second unpolarized white light beam 36 is reflected by the reflector 47 into the horizontal direction and propagates through medium 46, then illuminating the green green filter 45 and the reflector 44 and emerges in the vertical direction as a polarized green beam 39. Finally, the third unpolarized white light beam 37 is reflected by reflector 49 into the horizontal position and propagates through medium 50, then illuminating the blue filter 48 and the reflector 47 and emerges as in the vertical direction as a polarized blue beam. This is repeated through out the entire slice 33. The slice, therefore, has just carried out the function of converting a two dimensional unpolarized white light beam into a regular array of red, green and blue polarized beams as shown in FIG. 3 b.

It is important to note that the unpolarized white light enters the slice vertically from one side and emerges vertically from the other side of the slice. Therefore, it is considered as a transmission polarizing filter array even though microscopically small 45 degree reflectors are used within the slice it self. The array period, P, is typically 100 to 150 micron and the slice thickness, T, is also 100 to 150 micron. By varying the angle 68, the slice thickness, and the media 43, 46, 50 thicknesses, the array period can be adjusted to whatever design value desired. For practical reasons, T may be several times larger than P, and in this case several internal reflections of the beams 35, 36, 37 will be required.

FIG. 3 c illustrates how polarizing efficiency approaching 100% is achieved using the CLCS polarizing filters. The CLCS has the property of converting an unpolarized light beam into a reflected circularly polarized beam of polarization state P1, and a transmitted circularly polarized beam of the opposite state P2. Use is made also of another well known property of circularly polarized light which is its conversion to the opposite polarization state when it is reflected by a metallic reflector. In FIG. 3 c, the unpolarized white light beam 35 is reflected by the reflector 44 into the horizontal position, and then illuminates the red CLCS filter 42. It produces the reflected circularly polarized beam 51a with a state P1, and the transmitted beam 51b of state P2. This beam 51b is reflected by reflector 41 and its state is converted to P1. Thus two polarized red beams 51a and 52 of the same state P1 emerge and no red energy is wasted, resulting 100% polarization efficiency. In contrast, the most commonly used sheet polarizers based on polyvinyl alcohol polymers, is of the absorptive class, it transmits the light with the desired polarization state, while absorbing (converting in to heat) the opposite state. This class of polarizers is intrinsically incapable of producing more that 50%, and in fact the best achieves only 45%.

The polarizing filter array 33 described in FIGS. 3 *a–c* using CLCS to produce 100% polarization efficiency in the *transmission mode* can now be used for liquid crystal display as shown i FIG. 3 *d*. It combines the functions of the substrate, the polarizer, and the filter array, and therefore, can replace the three layers 7, 10, and 11 in FIG. 1 *a*. The transparent electrode 55, the aligning layer 54, and liquid crystal film can be deposited directly on it. The following is a summary of the benefits and advantages of the present invention for LCD:

- 100% polarization efficiency, which can be traded off for increased brightness, reduced cost, weights and power of the back light source.
- Replacing 3 critical parts with one part, increase yield, performance, and reduces manufacturing cost.
- The elimination of numerous fabrication steps of the color filters which require costly tools for patterning each filter photographically, or photolithographically and its subsequent transfer to the glass substrate.
- Flexibility of filter material results in choosing the highest quality filters that are reproducible and stable. The invention allows the introduction of any new filter technology easily, where as prior art requires extensive and costly new development activities for patterning and transferring any new filter technology.

Figure 4:
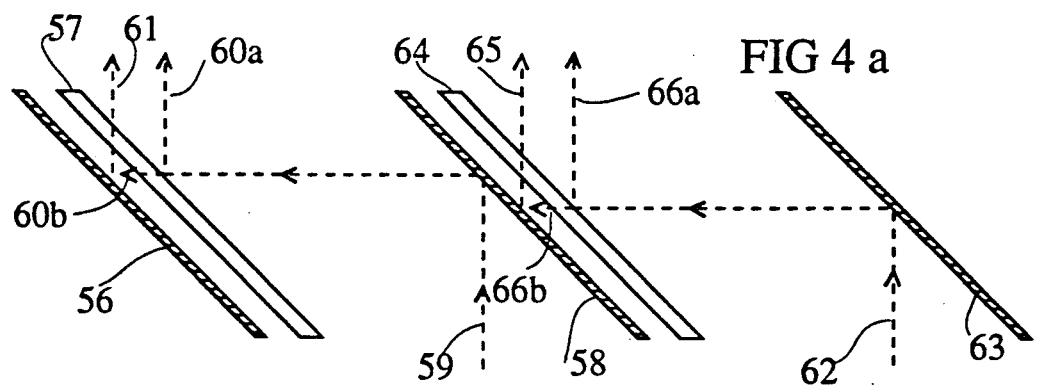
FIG. 4 a-c illustrates how micro-polarizer arrays are made with transmission polarizing efficiency approaching 100%.
Figure 4:
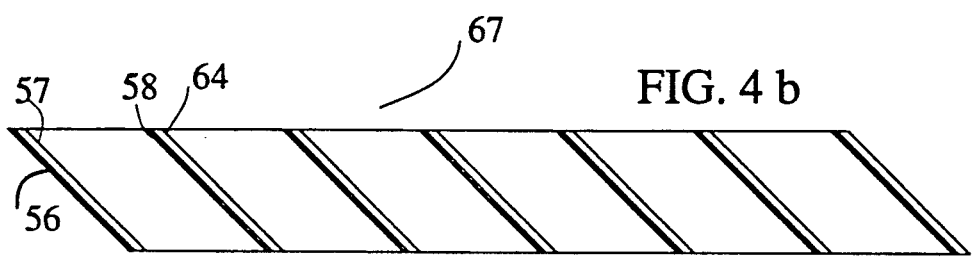
Figure 4:
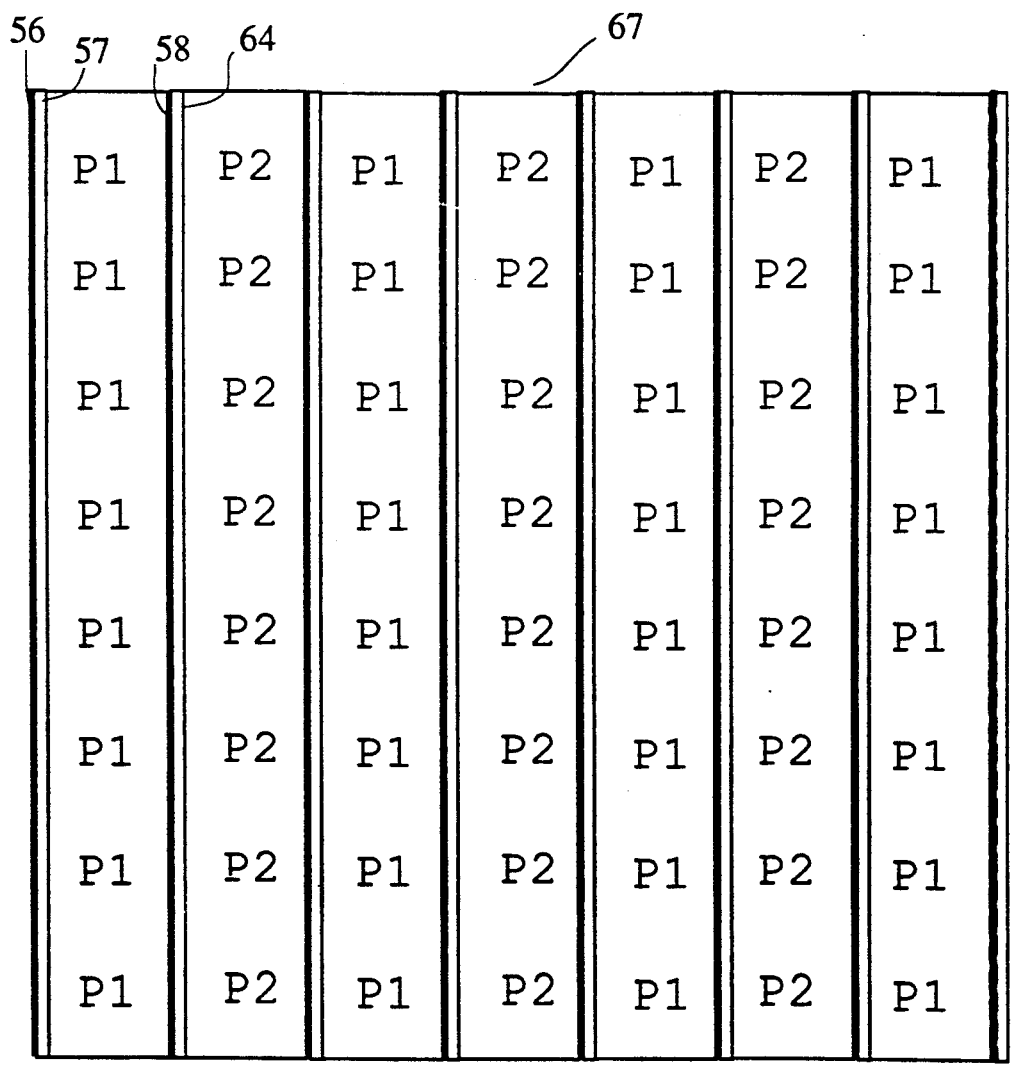

As illustrated in FIG. 4, using the same fabrication method described above, it is possible to produce micro-polarizer arrays with polarization efficiency of 100% in the *transmission mode* in the broad wavelength range of 400 nm to 800 nm (the visible spectrum). Use is made of another CLCS sheet polarizer property: that is if one surface of the CLCS sheet reflects polarization state P1 and transmits polarization state P2, the opposite surface, reflects polarization state P2 and transmits state P1. In the stack of FIG. 2 *b*, the laminates 22 use CLCS as the polarizer film 25, but the surfaces 25 alternate between reflector of P1 and reflector P2 and so on down the stack. For instance, the first laminate 22 in the stack has a film 25 with the top surface reflecting P1, then the second laminate 22 in the stack has a film 25 with the top surface reflecting P2, and so on. In FIG. 4 *a*, the unpolarized white light beam 59 is reflected by the reflector 58 into the horizontal direction and then illuminates the surface of the broad-band CLCS film 57 that reflects the P1 state as beam 60*a*, and transmits the P2 state as beam 60*b*. This is then reflected by reflector 56 which converts its state to P1 as beam 61. Thus, the unpolarized white beam 59 is converted into polarized white beam (the sum of beams 60*a* and 61) with state P1 with conversion efficiency of 100% (neglecting surface reflection losses which can be minimized). Similarly, unpolarized white light beam 62 is first reflected by reflector 63 into the horizontal direction, and then illuminates the surface of the CLCS film 64 which reflects the P2 state as beam 66*a* and transmits the P1 state as beam 66*b*. This is then reflected by reflector 58 which converts its state to P1 as beam 65. With 100% efficiency the unpolarized beam 62 is converted to polarized beam (the sum of beams 65 and 66*a*) with a state P2. In this manner, a whole micro-polarizer array 67 with states alternating between P1 and P2 is produced with 100% efficiency in the transmission mode as shown in FIGS. 4 *b–c*.

The method of the present invention can produced a variety of patterns, color filters with more than 3 colors, and more than 2 polarization states with yet different polarization efficiencies. This is accomplished by mixing the desired layers in the stack in the desired order. The simplest stack is made of identical CLCS layers which will produce a large area polarizer sheet (slice) with a single state but with 100% efficiency in the transmission mode. No prior art teaches how to achieve this. Such polarizers have many applications such as polarized eye glasses which are completely clear, and 3-D stereo computer displays, and other optical systems.

What is claimed is:

1. A method for manufacturing polarizing color filter arrays with high transmission mode polarization efficiency, comprising the following steps:
   a. providing a plurality of sheets having identical optical properties or having different optical properties but are arranged to repeat periodically in a stack configuration that minimizes material waste in subsequent processing steps, said plurality of sheets are bonded together forming the stack;
   b. making many slices of thickness ranging from 0.1 mm to 10 mm, by slicing the bonded stack at an angle with respect to the direction of the stack that varies between 10° to 70° depending on the application; and
   c. polishing both sides of each slice to obtain an optical finish suitable for imagining applications, said polished slices are the desired polarizing filter arrays.

2. A method for manufacturing polarizing color filter arrays according to claim 1, wherein each of the plurality of sheets further comprises:
   a. a clear dielectric substrate material of glass, polymer, or other clear material with a thickness ranging from 0.1 mm to 10 mm;
   b. color filter layers coated or laminated on one or both sides of the substrate;
   c. polarizing layers coated or laminated on one or both sides of the substrate after the filter layers;
   d. reflecting layers coated or laminated on one or both sides of the substrate after the polarizing layers; and
   e. the combined thickness of all the layers bonded to the substrate is substantially less than the substrates thickness.

3. A method for manufacturing polarizing color filter arrays according to claim 2, wherein each polarizing layer is made of cholesteric liquid crystal material.

4. A method for manufacturing polarizing color filter arrays according to claim 2, wherein each polarizing layer is made of a multi-dielectric-film polarizer.

5. A method for manufacturing polarizing color filter arrays according to claim 2, wherein at least one of the polarizing layers is a single color cholesteric liquid crystal silicone polymer.

6. A method for manufacturing polarizing color filter arrays according to claim 2, wherein at least one of the polarizing layers is a multiple color cholesteric liquid crystal silicone polymer.

7. A method for manufacturing polarizing color filter arrays according to claim 2, wherein the polarizing layers are made of dichroic polymers such as stretched polyvinyl alcohol treated with iodine solution.

8. A method for manufacturing polarizing color filter arrays according to claim 2, wherein the polarizing layers are made of birefringent materials.

9. A method for manufacturing polarizing color filter arrays according to claim 2, wherein the color filter layers laminated to the substrate possess a multicolor pattern.

10. A method for manufacturing polarizing color filter arrays according to claim 2, wherein the polarizing layers possess a multi-polarization state pattern.

11. A method for manufacturing polarizing color filter arrays according to claim 2, wherein the reflecting layers are made aluminum, gold, silver, or other reflecting metals.

12. A method for manufacturing polarizing color filter arrays according to claim 2, wherein one reflecting layer on one side of the substrate is made of a thin metal film, and a second reflecting layer on the other side of the substrate is made of a dielectric material with an index of refraction substantially smaller than that of the substrates so that total internal reflection is achieved.

13. A method for manufacturing polarizing color filter arrays according to claim 1, wherein the stack configuration which produces the minimum material waste during the slicing step is achieved by means of an inclined support wall having an angle which is identical to the desired slicing angle, the ends of the plurality of sheets of the stack are moved until they are in contact with said inclined support, and the sheets of the stack are pressed and bonded together permanently.

14. A color liquid crystal display system fabrication method featuring fewer parts, lower cost, higher yield, and more than a factor of 2 higher brightness, comprising:
   a. a liquid crystal material interposed between a first high efficiency polarizing substrate fabricated according to claim 1 and a second high efficiency polarizing filter array substrate;
   b. a collimated back lighting means;
   c. display drive electronics;
   d. devices transparent electrodes, and aligning layer, fabricated on the inner surface of said first substrate, to control the light transmission of each pixels;
   e. a transparent electrode of indium-tin-oxide, and an aligning layer made of polyimide deposited on the second substrate; and
   f. an assembly step for completing the display by brining together, after proper registration, the first and second substrates at a separation of approximately 10 to 20 micron, determined by a special spacer, forming a cell which is then filled with liquid crystal and sealed by well known means.

15. A color liquid crystal 3-D stereo display system fabrication method featuring fewer parts, lower cost, higher yield, and more than a factor of 2 higher brightness, comprising:
   a. a liquid crystal material interposed between a first high efficiency micro-polarizer filter array substrate fabricated according to claim 1, and a second high efficiency micro-polarizer color filter array substrate;
   b. a collimated back lighting means;
   c. display drive electronics;
   d. devices transparent electrodes, and aligning layer, fabricated on the inner surface of said first substrate, to control the light transmission of each pixels;
   e. a transparent electrode of indium-tin-oxide, and an aligning layer made of polyimide deposited on the second substrate;
   f. an assembling step for completing the display by bringing together, after proper registration, the first and second substrates at a separation of approximately 10 to 20 micron, determined by a special spacer, forming a cell which is then filled with liquid crystal and sealed by well known means, the stereo image is produced by coding the left perspective with one polarization state of first and said micropolarizer arrays, and the right perspective with the orthogonal polarization state, and, as is well known, the stereo image is viewed through polarized glasses.

16. A window or light valve system whose transmission of light can be continuously varied from a completely opaque state, dark state, to a completely transparent state, clear state, with nearly 100% transmission of the incident light, an improvement of at least a factor of 2 over previously known techniques, comprising: a first and second 100% efficiency micropolarizer arrays fabricated according to claim 1, and an image or light source located behind said second micro-polarizer array; said first micropolarizer array is movable sideways manually or electro-mechanically relative to a fixed second micro-polarizer array; the opaque state is produced when the P1 and the P2 polarization state of the first micro-polarizer array completely overlap respectively the P2 and the P1 states of the second array; and the clear state is produced when the first arrays is moved so that its P1 and P2 states completely overlap respectively the P1 and the P2 states of the second array.

17. A method for manufacturing micro-polarize arrays with high transmission mode polarization efficiency, comprising the following steps:
   a. providing a plurality of sheets having identical optical polarizing properties or having different polarization states but are arranged to repeat periodically in a stack configuration that minimizes material waste in subsequent processing steps, said plurality of sheets are bonded together forming the stack;
   b. making many slices of thickness ranging from 0.1 mm to 10 mm, by slicing the bonded stack at an angle with respect to the direction of the stack that varies between 10° to 70° depending on the application; and
   c. polishing both sides of each slice to obtain an optical finish suitable for imaging applications, said polished slices are the desired micro-polarizer arrays.

18. A method for manufacturing micro-polarizer arrays with high transmission mode polarization efficiency according to claim 17, wherein each of the plurality of sheets further comprises:
   a. a clear dielectric substrate material of glass, polymer, or other clear material with a thickness ranging from 0.1 mm to 10 mm;
   b. polarizing layers coated or laminated on one or both sides of the substrate;
   c. reflecting layers coated or laminated on one or both sides of the substrate after the polarizing layers; and
   d. the combined thickness of all the layers bonded to the substrate is substantially less than the substrates thickness.

19. A method for manufacturing micro-polarizer arrays with high transmission mode polarization efficiency according to claim 18, wherein each polarizing layer is made of cholesteric liquid crystal-based material.

20. A method for manufacturing micro-polarizing arrays with high transmission mode polarization efficiency according to claim 18, wherein each polarizing layer is made of a multi-dielectric-film polarizer.

21. A method for manufacturing micro-polarizing arrays with high transmission mode polarization efficiency according to claim 18, wherein at least one of the polarizing layers is a single color cholesteric liquid crystal silicone polymer.

22. A method for manufacturing micro-polarizing arrays with high transmission mode polarization efficiency according to claim 18, wherein each polarizing layer is multiple color cholesteric liquid crystal silicone polymer.

23. A method for manufacturing micro-polarizing arrays with high transmission mode polarization efficiency according to claim 18, wherein the polarizing layers are made of dichroic polymers such as stretched polyvinyl alcohol treated with iodine solution.

24. A method for manufacturing micro-polarizing arrays with high transmission mode polarization efficiency according to claim 18, wherein the polarizing layers are made of birefringent materials.

25. A method for manufacturing micro-polarizing arrays with high transmission mode polarization efficiency according to claim 18, wherein the polarizing layers possess a multi-polarization state pattern.

26. A method for manufacturing micro-polarizing arrays with high transmission mode polarization efficiency according to claim 18, wherein the reflecting layers are made aluminum, gold, silver, or other reflecting metals.

27. A method for manufacturing micro-polarizing arrays with high transmission mode polarization efficiency according to claim 18, wherein one reflecting layer on one side of the substrate is made of a thin metal film, and a second reflecting layer on the other side of the substrate is made of a dielectric material with an index of refraction substantially smaller than that of the substrates so that total internal reflection is achieved.

* * * * *